Jan. 18, 1944. J. R. MADEIRA 2,339,496
JUNCTION BOX
Filed Aug. 29, 1942 3 Sheets-Sheet 1

INVENTOR.
John R. Madeira
BY Clarence F. Poole
ATTORNEY

Jan. 18, 1944.   J. R. MADEIRA   2,339,496
JUNCTION BOX
Filed Aug. 29, 1942   3 Sheets-Sheet 2
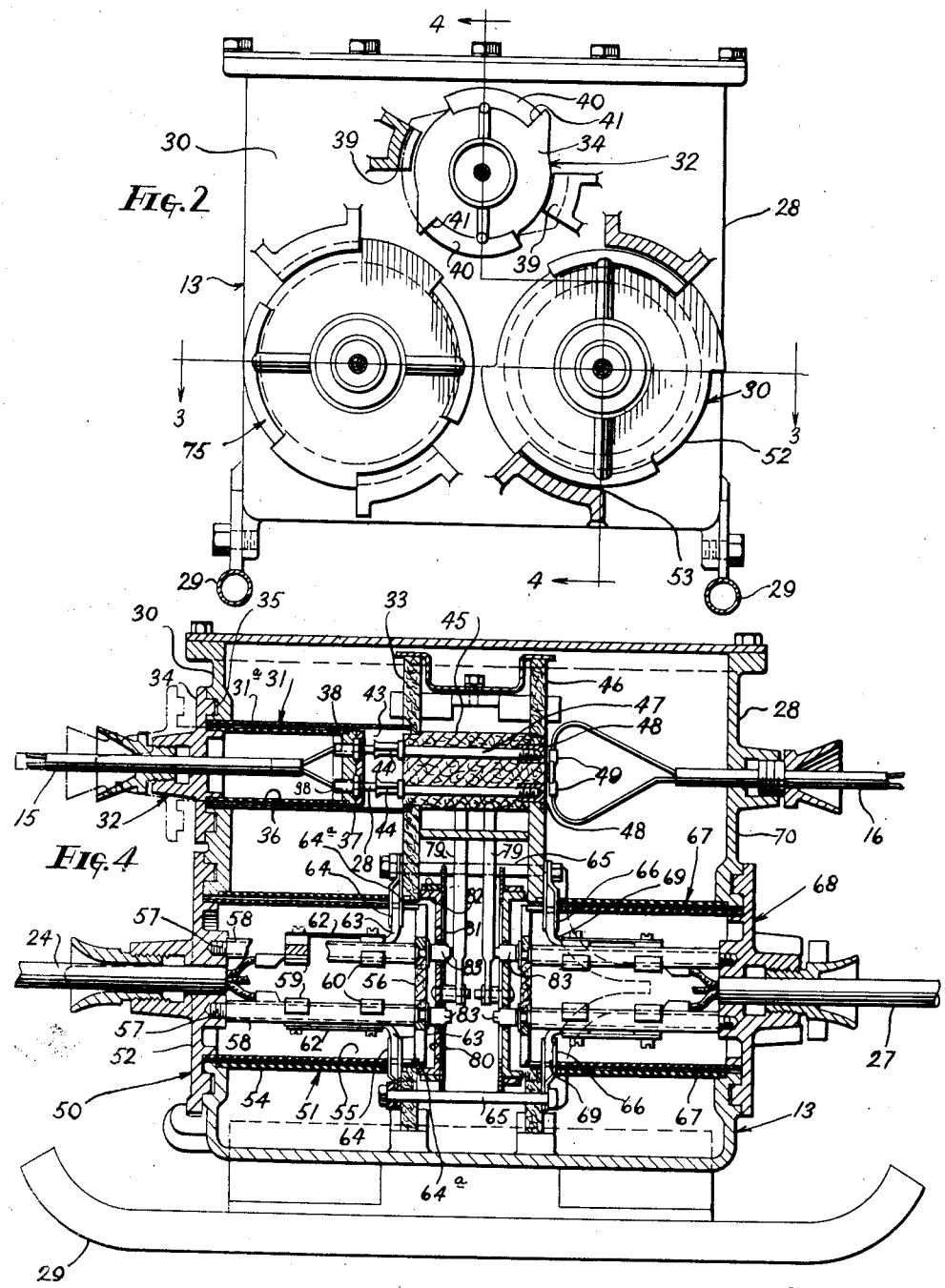
INVENTOR.
John R. Madeira
BY Clarence F. Poole
ATTORNEY Jan. 18, 1944.  J. R. MADEIRA  2,339,496
JUNCTION BOX
Filed Aug. 29, 1942  3 Sheets-Sheet 3
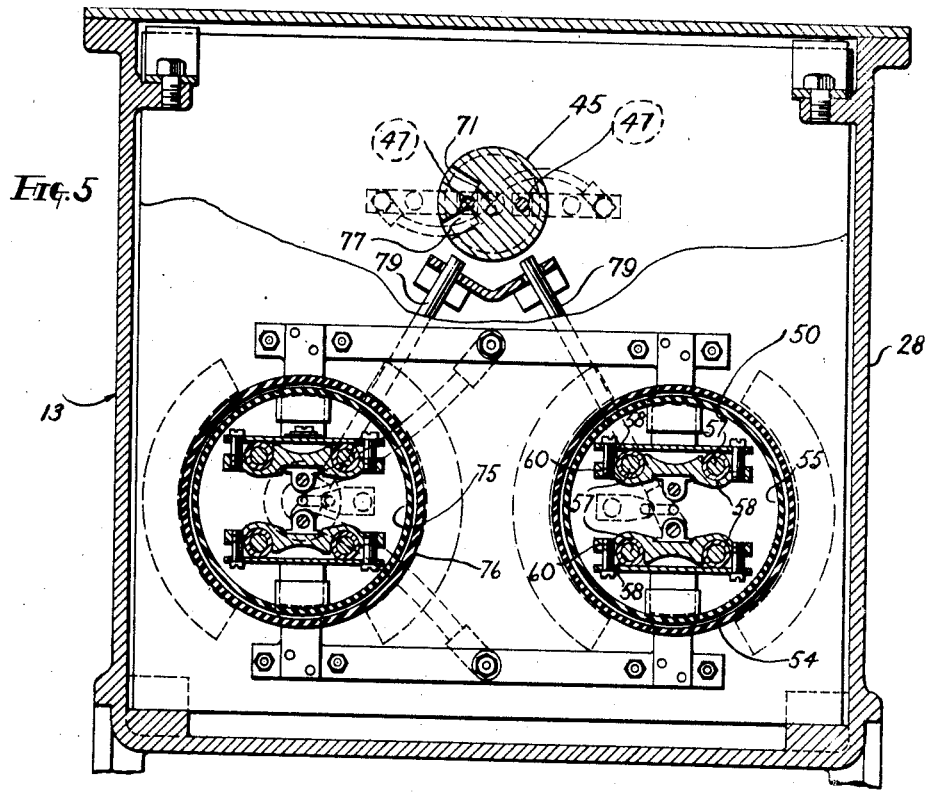
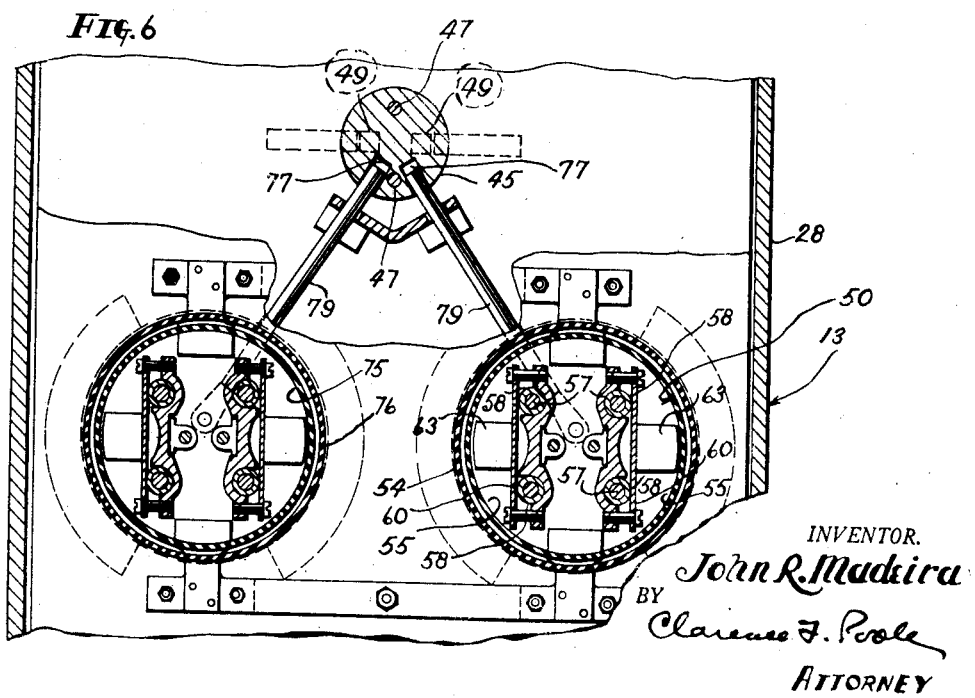
INVENTOR.
John R. Madeira
BY
Clarence F. Poole
ATTORNEY Patented Jan. 18, 1944

2,339,496

UNITED STATES PATENT OFFICE 2,339,496

JUNCTION BOX

John R. Madeira, Chicago, Ill., assignor to Goodman Manufacturing Company, Chicago, Ill., a corporation of Illinois Application August 29, 1942, Serial No. 456,662

9 Claims. (Cl. 200—50)

This invention relates to improvements in junction boxes for a plurality of electric power connections, for operating a plurality of conveyers or other devices from a single controller, and particularly adapted for use underground in gaseous mines.

The principal objects of my invention are to provide a novel form of junction box having particular reference to safety in underground mining and so arranged as to mechanically and electrically interlock a plurality of removable power connections so that none of these power connections can be removed or replaced while the electric circuit is closed, to obviate the danger of arcing or explosion that might be caused by the removal of the power connections while electric power is connected in the circuits.

Other objects of my invention will appear from time to time as the following specification proceeds and with reference to the accompanying drawings wherein:

Figure 2 is an end view of a junction box constructed in accordance with my invention, with certain parts shown in section;

Figure 4 is an enlarged longitudinal sectional view taken substantially along line 4—4 of Figure 2;

Figure 5 is a fragmentary transverse sectional view taken through the junction box shown in Figure 2, showing the electrical connections and the mechanical interlock in a locked position; and Figure 6 is a fragmentary transverse sectional view showing the interlock in an unlocked position, so the connector plugs from the main line circuit may be removed therefrom.

Figure 1:
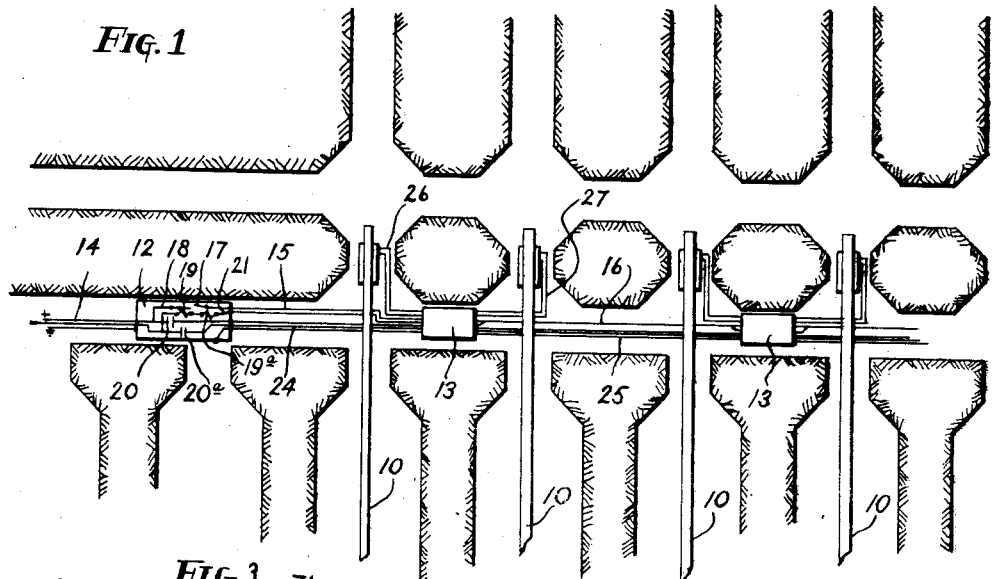
Figure 1 is a diagrammatic view of a portion of a mine showing a plurality of conveyers extending into the working places of the mine and showing a plurality of junction boxes constructed in accordance with my invention, for connecting these conveyers to a source of power through a single control box.

Referring now in particular to the drawings, Figure 1 illustrates generally a section of a mine where the working places terminate into a cross entry, and shows a plurality of conveyers 10, 10, preferably of a shaker type extending into the working places or rooms of the mine. A central control box 12 is provided to control operation of these conveyers, and a plurality of junction boxes 13, 13 are shown as being connected to this central control box and as forming a means for connecting said conveyer to a source of power through said central control box.

The central control box will not herein be described in detail and is only shown diagrammatically since it is no part of my present invention. A cable 14, connected with a main source of power is connected with said control box. A control line 15 leads from said control box to the first junction box 13. This control line is electrically connected through said junction box with a control line 16, which connects the two junction boxes together. A push button switch 17 is provided in said control box in a positive conductor 18 of said control line, to close a circuit from the cable 14 through said control line 15. Said control box also includes a contactor 20 having an operating coil 19 in a negative conductor 21 of said control line, to close said contactor when said push button switch 17 is closed. This contactor closes the main line circuit to the positive conductor of a cable 24, connecting said control box with the first junction box 13. A contactor 20a is also provided in the negative conductor of said cable 24, to close the circuit through the negative conductor of said cable, when the circuit through the positive conductor of said cable is closed. Said contactor is closed, when the contactor 20 closes, by means of an operating coil 19a in the negative conductor 21 of said control line. A main line cable 25, electrically connected with the cable 24 through said first junction box 13, connects said first junction box with the next junction box. A cable 26 connects the first junction box 13 with one conveyer drive motor, while a cable 27 connects said junction box with another conveyer drive motor.

The second junction box is connected with the two conveyers 10 in the same manner the first junction box is connected with its two conveyers. In a similar manner other junction boxes may be successively connected to the main line source of power supply, in series with said junction boxes.

The junction boxes 13, 13 embodying the novel features of my invention are of a similar construction, so one only will herein be shown and described in detail. Said junction box includes a casing 28, herein shown as being mounted on skids 29, 29, so it may readily be moved about the mine. A receptacle 31 for a power plug 32 on the end of the control line 15 is provided in an end wall 30 of said junction box. Said receptacle, as herein shown, has a cylindrical wall portion 31a made from an insulating material, the inner end of which abuts and is mounted in a vertically extending insulating board 33, mounted within said casing (see Figure 4).

The plug 32 includes an outer cover 34 having an inwardly projecting annular tongue 35 adapted to have engagement with a corresponding annular groove formed in the end wall 30 of the casing 28, to form a joint of sufficient area to cool a flame within said casing to such a degree that it will not ignite gases on the outside of said casing. A bayonet joint is provided to lock said plug in position in said end wall. Said bayonet joint consists in a pair of oppositely spaced segmental retaining members 39, 39 extending outwardly from said end wall and projecting inwardly towards and overlapping the outer sides of outwardly projecting segmental flanged portions 40, 40 of said cover. Stops 41, 41 are provided on said segmental flanged portions, to limit turning movement of said cover beyond a point where said plug is fully inserted and locked in position in said receptacle.

A sleeve 36 is secured to and extends inwardly from the cover 34. Said sleeve is preferably made from an insulating material and has a cylindrical block 37 secured to its inner end, which forms a closure member therefor. Contacts 38, 38 are mounted in said cylindrical block and extend therethrough from the inside of said block towards the center of the casing 28. The control cable 15 extends through the cover 34 within said plug. Said cable is secured to said plug by means of a packing member 42, threaded in the outer side of said plug, and the conductors of said cable are connected to said contacts 38, 38.

The portions of the contacts 38, 38, which project from the inner ends of the plug 32, are of a knife-like formation and are adapted to detachably fit between the prongs of contacts 44, 44 projecting from a rotatable drum 45. Said drum may be made from a suitable insulating material, such as wood, and is rotatably mounted in the insulating board 33 at one of its ends and in a parallel spaced insulating board 46, at its opposite end.

The pronged contacts 44, 44 are herein shown as being formed integral with threaded rods 47, 47, which extend through said drum, and which are threaded at their ends opposite said threaded contacts within contacts 48, 48, which are mounted in the end of said drum opposite from said pronged contacts. Upon turning said drum by the cover 34 for the plug 32, to a position where said plug is locked within said casing and the stops 41, 41 engage the retaining members 39, 39, said contacts 48, 48 will engage contacts 49, 49 connected with the control line 16 leading to the next junction box 13, to complete an electrical circuit through said control line. When said circuit is broken by turning said plug to a position where it can be removed from said casing, the contacts 48, 48 will be disengaged from the contacts 49, 49 and the circuit through the cable 15 will be broken, causing the contactor 20 to drop out and disconnect power from the cable 24. Thus electric current can only pass through the cable 24 when the circuit through the cable 15 is closed, and said circuit can only be closed when the plug 32 is locked in position in the junction box 13; and where other junction boxes are connected in series with said first junction box, the main line circuit can only be closed when each control line plug is locked in position in its respective junction box. This provides an electrical interlock for disconnecting the main line cable from the source of power, whenever the circuit through the control line is broken.

It should here be understood that when only one junction box is used, provisions may be made to close the circuit through one box, when the plug 32 is locked in position in said box, as by connecting the conductors of the control cable 16 leading from this junction box together. The same may be done with the end junction box of a series of junction boxes, where a number of junction boxes are used, to close the electrical circuit through all of the junction boxes, when the respective control line plugs are in position in said junction boxes.

The cable 24 has a plug 50 on the free end thereof, which is adapted to fit within a receptacle 51, extending inwardly from the end wall 30, within the casing 28. Said plug includes a cover 52 similar to the cover 34, and having tongue and groove engagement with the end wall 30, to aid in extinguishing any arcs within the casing 28. Said cover is locked in position in said end wall by means of a bayonet joint generally indicated by reference character 53, similar to the bayonet joint which detachably locks the plug 32 within said end wall of said casing.

Figure 3:
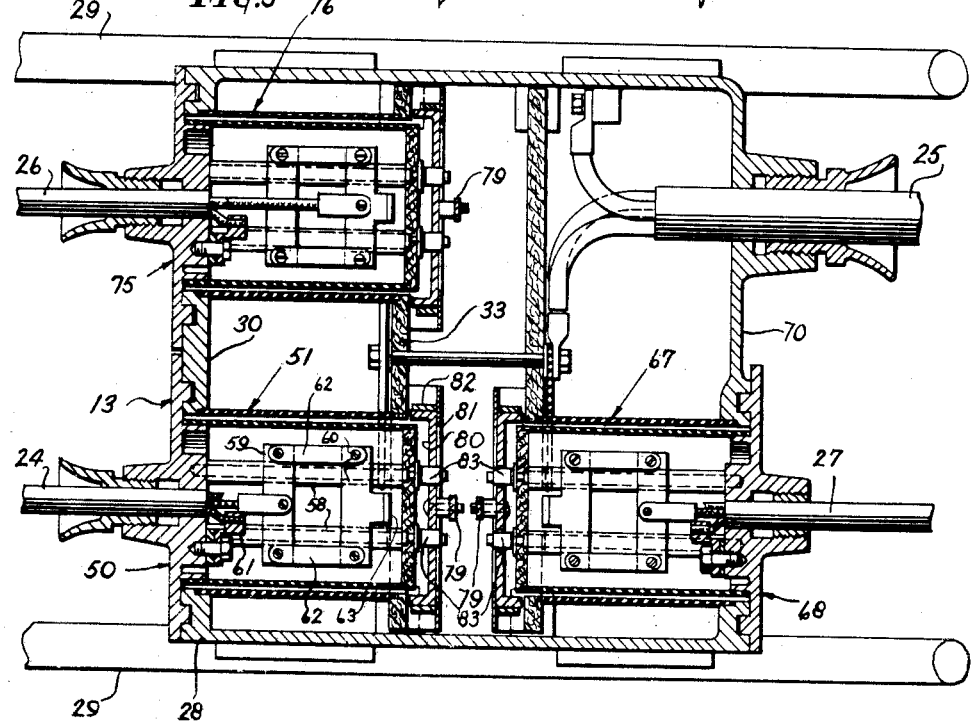
Figure 3 is an enlarged horizontal sectional view taken substantially along line 3—3 of Figure 2.

The receptacle 51 includes a cylindrical member 54, made from a suitable insulating material, which extends inwardly from the end wall 30 and which is mounted therein at one of its ends. The other end of said cylindrical member is mounted in the insulating board 33. A cylindrical closure member 55, made from insulating material, is secured to and extends inwardly from the cover 52, within the casing 28. Said closure member has a circular block 56, secured to its inner end and connected to the cover 52 by means of two pairs of parallel spaced threaded rods 57, 57. Insulating tubes 58, 58 are mounted on said rods and form a mounting for connectors 59, 59 and 60, 60. A positive conductor of the cable 24 is connected to one connector 59, while a negative conductor of said cable is connected to the other connector 59. The third conductor of said cable is provided to ground the casing, and is connected thereto through a connector 61 (see Figure 3). The connectors 59 and 60 are connected together by means of fuses 62, 62 and the connectors 60, 60 each have a contact blade 63 secured thereto and extending radially outwardly therefrom. Said contact blades are adapted to be engaged between the prongs of contacts 64, 64, which extend radially within the cylindrical closure member 55 through openings 64a, 64a provided therein.

The pronged contacts 64, 64 are secured to the insulating board 33 by means of connecting bolts 65, 65, which extend through said insulating board and the insulating board 46 and serve to connect pronged contacts 66, 66, similar to the contacts 64, 64, to said last mentioned insulating board, and to form a means for electrically connecting said contacts together. Said contacts 66, 66 extend within a receptacle 67 for a plug 68, and extend radially within said plug in the same manner the pronged contacts 64, 64 extend within the plug 50. Said last named contacts 66, 66 are adapted to detachably engage contacts 69, 69, within said plug, and complete an electrical circuit from the cable 24 to the cable 27, which is connected with one of the conveyer drive motors, for supplying electric power thereto (see Figure 4).

The plug 68 is similar to the plug 50 so will not herein be described in detail. Said plug is detachably mounted in the receptacle 67 in an end wall 70 which is opposite from the end wall 30, in the same manner the plug 50 is mounted in said end wall 30.

Another plug 75 is insertible in a receptacle 76 alongside of the receptacle 51. Said plug is electrically connected with the cable 24 through the contacts 64, 64, when the contacts 63, 63 of the plug 50 are in engagement therewith, and electrically connects said junction box with another conveyer motor through the cable 26. Said plug is similar in construction to the plugs 50 and 68, so will not herein be described in detail.

The electric connections within said junction box are such that when the plugs 50, 68 and 75 are inserted in their respective receptacles and are locked in position in the casing 28, in the manner previously described, current may flow from the main line to the two conveyer drive motors and may also flow to the next junction box through the cable 25, when the main line circuit is closed at the central control box 12. Said last mentioned cable is fixedly secured within said junction box and has electrical connection with the cable 24, through the switch formed by the contacts 63, 63 and 64, 64, so main line current going into said junction box will leave said junction box through said cable 25 to the next adjacent junction box.

Referring now in particular to the details of the mechanical interlock between the plug 32 and the plugs 50, 68 and 75, for preventing removal of any of said plugs until the plug 32 has been turned to a position where the contacts 48, 48 are disengaged from the contacts 49, 49, the drum 45 is provided with a plurality of radially extending apertures 77, 77 formed therein, adapted to be engaged by plungers 79, 79. Said plungers 79, 79 are each operatively connected with an associated plug 50, 68 and 75, so as to be moved towards or away from the drum 45, upon turning of the respective plug in a direction to electrically connect it with or disconnect it from the associated contacts within the casing 28.

The plungers 79, 79 are each of a similar construction and are each connected with their associated plugs in a similar manner, so only the connection from the plunger associated with the plug 50 will herein be described in detail. Said plunger has pivotal connection with an annular flanged plate 80, eccentric of the center of said plate. Said plate is on the inside of the insulating board 33 and the flanged portion thereof extends towards said insulating board and terminates closely adjacent said board. An annular ring 81 abuts the inside of said plate and has a flanged portion 82, which extends along the flange of said plate and serves as a bearing for said plate. A pair of bearing or engaging members 83, 83 extend through said plate and loosely engage suitable apertured portions of said plate, for turning said plate upon turning movement of said plug. Said engaging members are threaded on the ends of the threaded rods 57, 57.

The point of pivotal connection of said plunger to said plate is such that when the contacts 63, 63 are in engagement with the contacts 64, 64, said plunger will be in a retracted position as is shown in Figure 5, to permit removal of the plug 32 by first turning said plug 32 and the drum 45, and then pulling said plug rectilinearly from the receptacle. This will break the circuit through the cable 24, and permit removal of the plugs 50, 68 and 75 from their respective receptacles. When said plug 50 is turned to a position to disengage the contacts 63 from the contacts 64, 64, the plunger 79 will be extended towards the drum 45 and will engage said drum, to prevent turning of said plug beyond a predetermined point and thus prevent the disengagement of the contacts 63 from the contacts 64, except when the drum 45 is positioned so said plunger can extend within the associated aperture 77 in said drum.

Thus the plugs 50, 68 and 75 must be inserted in the casing, and the contacts therefor must be closed before the plug 32 can be turned to engage the contacts 48, 48 with the contacts 49, 49, to close the circuit from the control box 12 through the cable 24. When all of the plugs are locked in position in said junction box, the plugs 50, 68 and 75 cannot be removed until the plug 32 has been turned to a position to break the electrical connection between the contacts 48, 48 and 49, 49 and is in a position so it can be removed from the casing, it being understood that as soon as the electrical connection between said contacts is broken, the contactors 20 and 20a in the control box 12 will open, to break the circuit to the cable 24 and disconnect all of the junction boxes from the source of power supply.

It may be seen from the foregoing that a novel form of electrical and mechanically interlocked junction box has been provided which is so arranged that a plurality of conductors may be detachably connected thereto and may lead therefrom and that none of these conductors can be moved to a position to break the main line circuit as long as current is flowing through the main line. It may further be seen that the arrangement is such that any number of main line conductors may readily be provided, if desired, so that any desired number of conveyers may be connected with a single junction box.

While I have herein shown or described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In an explosion-proof electric junction box, an enclosed casing, a plurality of receptacles in said casing adapted to serve as power inlets and as power outlets, a plurality of electric power plugs insertible in said receptacles and forming electric circuit connections therewith, each of said plugs being adapted to make an electric circuit upon insertion in their respective receptacles and upon turning movement of said plugs within said receptacles to a locked position, and an interlocking connection between said plugs, to prevent removal of any one of said plugs from said casing until the electric circuit to each of said plugs has been broken including a locking member associated with one of said plugs, and means associated with said other plugs and engageable with said locking member to prevent removal of said other plugs until said locking member is in a predetermined position and the plug associated therewith has been turned to a position to break its electric circuit within said casing.

2. In an explosion-proof electric junction box, an enclosed casing, a plurality of receptacles in said casing adapted to serve as power inlets and as power outlets, a plurality of electric power plugs, insertible in said receptacles and forming electric circuit connections therewith, and an interlocking connection between said plugs, to prevent removal of any one of said plugs from said casing until the electric circuit to each of said plugs has been broken including a locking member connectible with one of said plugs and movable with said plug, upon movement of said plug to a position to permit removal thereof from said casing, said plug being adapted to break a circuit to said other plugs upon movement to a position where it can be removed from said casing, and a member associated with each of said other plugs and adapted to engage said locking member upon the attempted removal of said plugs to prevent removal thereof until said plug associated with said locking member has been moved to a position where it can be removed from said casing.

3. In an explosion-proof electric junction box, an enclosed casing, a plurality of receptacles in said casing adapted to serve as power inlets and as power outlets, a plurality of electric power plugs insertible in said receptacles and forming electric circuit connections therewith, said plugs completing said electric circuit connections by turning movement with respect to said receptacles, interengaging connections between said plugs and casing to lock said plugs within said casing when turned to a position to close said circuit connections, means to lock all but one of said plugs from turning movement until the circuit through said plugs is broken, including a locking member associated with said one plug and adapted to break an electrical circuit to said other plugs when said one plug is turned to a position to be removed from said casing, and means associated with said other plugs and engageable with said locking member to prevent turning movement of said other plugs until said locking member has been moved to a position to break the circuit through all of said plugs.

4. In an explosion-proof electric junction box, an enclosed casing, a plurality of receptacles in said casing adapted to serve as power inlets and as power outlets, a plurality of electric power plugs insertible in said receptacles and forming electric circuit connections therewith, said plugs completing said electric circuit connections by turning movement with respect to said receptacles, interengaging connections between said plugs and casing to lock said plugs within said casing when turned to a position to close said circuit connections, and means to lock all but one of said plugs from turning movement until the electric circuit through all of said plugs is broken including a rotatable locking member adapted to break the electrical circuit from said one plug, when said one plug is turned to a position so it can be removed from said casing, and to cause the electrical circuits from said other plugs to be broken, and means connected with said other plugs and engageable with said locking member, to prevent turning movement of said associated plugs until said locking member has been moved to a position to break the circuit through all of said plugs.

5. In an explosion-proof electric junction box, an enclosed casing, a plurality of receptacles in said casing adapted to serve as power inlets and as power outlets, a plurality of electric power plugs insertible in said receptacles and forming electric circuit connections therewith, said plugs completing said electric circuit connections by turning movement with respect to said receptacles, interengaging connections between said plugs and casing to lock said plugs within said casing when turned to a position to close said circuit connections, means to lock all but one of said plugs from turning movement until the circuit through said plugs is broken, including a rotatable locking member adapted to break the electrical circuit from said one plug, when said one plug is turned to a position so it can be removed from said casing, and to cause the electrical circuits from said other plugs to be broken, and means connected with said other plugs and engageable with said locking member, to prevent turning movement of said associated plugs until said locking member has been moved to a position to break the circuit through all of said plugs, said means also being adapted to hold said locking member from turning movement, when any one or more of said other plugs are removed from their receptacles, to prevent the closing of the electrical circuits to said junction box and said other plugs until said other plugs are locked in position in said junction box.

6. In an explosion proof electric junction box, an enclosed casing, a plurality of receptacles in said casing adapted to serve as power inlets and as power outlets, a plurality of electric power plugs insertible in said receptacles and forming electric circuit connections therewith, said plugs completing said electric circuit connections by turning movement with respect to said receptacles, interengaging connections between said plugs and casing to lock said plugs within said casing when turned to a position to close said circuit connections, means to lock all but one of said plugs from turning movement until the circuit through said plugs is broken, including a rotatable locking member adapted to break the electrical circuit from said one plug, when said one plug is turned to a position so it can be removed from said casing, and to cause the electrical circuits from said other plugs to be broken upon breaking of the circuit from said one plug, a plunger connected with each of said other plugs and extensibly or retractibly moved with respect to said locking member upon turning movement of said associated plugs, said plungers being adapted to engage the outside of said locking member, to prevent turning movement of said associated plugs when said locking member is in a position to make the electrical circuit to said other plugs.

7. In an explosion proof electric junction box, an enclosed casing, a plurality of receptacles in said casing adapted to serve as power inlets and as power outlets, a plurality of electric power plugs insertible in said receptacles and forming electric circuit connections therewith, said plugs completing said electric circuit connections by turning movement with respect to said receptacles, interengaging connections between said plugs and casing to lock said plugs within said casing when turned to a position to close said circuit connections, means to lock all but one of said plugs from turning movement until the circuit through said plugs is broken, including a rotatable locking member adapted to break the electrical circuit from said one plug, when said one plug is turned to a position so it can be removed from said casing, and to cause the electrical circuits from said other plugs to be broken, a plunger connected with each of said other plugs and extensibly or retractibly moved with respect to said locking member upon turning movement of said associated plugs, said plungers being adapted to engage the outside of said locking member, to prevent turning movement of said associated plugs when said locking member is in a position to make the electrical circuit to said other plugs, and said locking member having a plurality of recessed portions formed therein adapted to receive said plungers when said circuit through said junction box is broken and said one plug is in position to be removed from said junction box and to prevent turning of said locking member to close the circuit to said other plugs, when any of said other plugs are in a position other than a fully locked position.

8. In an explosion proof electric junction box and in combination with an enclosed casing, a plurality of electric receptacles in said casing adapted to serve as power inlets and as power outlets, a plug insertible in each of said receptacles and adapted to be locked in said casing and to close a circuit therein, to form an electric circuit connection therewith, and to break a circuit within said casing when in an unlocked position, one of said plugs being adapted to serve as a switch to connect electric power to said junction box, when said plug is locked in position therein, and to disconnect power from said junction box when said plug is in position to be removed therefrom, and an interlocking connection between said plugs to prevent removal of said other plugs except when said switch plug is in position to be removed from said casing, and to prevent insertion of said switch plug when said other plugs are in an unlocked position in said casing.

9. In an explosion-proof electric junction box and in combination with an enclosed casing, a plurality of electric receptacles in said casing adapted to serve as power inlets and as power outlets, a plug insertible in each of said receptacles and adapted to be locked in said casing and to close a circuit therein, to form an electric circuit connection therewith, and to break a circuit within said casing when in an unlocked position, one of said plugs being adapted to serve as a switch to connect electric power to said junction box when said plug is locked in position therein and to disconnect power from said junction box when said plug is in position to be removed therefrom, an interlocking connection between said plugs to prevent removal of said other plugs except when said switch plug is in position to be removed from said casing, and to prevent insertion of said switch plug when said other plugs are in an unlocked position in said casing, including a rotatable locking member connected with one of said plugs and pivotally moved therewith upon movement of said plug to a locked or an unlocked position, a plunger connected with each of said other plugs and moved towards or away from said locking member upon movement of said associated plugs to a locked or an unlocked position, said plungers being adapted to prevent movement of their associated plugs in a direction so they may be removed from said casing except when the plug associated with said locking member is in a position to be removed from said casing.

JOHN R. MADEIRA.